United States Patent
Schrum

(10) Patent No.: US 9,300,491 B2
(45) Date of Patent: Mar. 29, 2016

(54) FRAME DELIVERY PATH SELECTION IN HYBRID COMMUNICATION NETWORKS

(75) Inventor: Sidney B. Schrum, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 1092 days.

(21) Appl. No.: 13/295,704

(22) Filed: Nov. 14, 2011

(65) Prior Publication Data

US 2012/0207163 A1 Aug. 16, 2012

Related U.S. Application Data

(60) Provisional application No. 61/441,938, filed on Feb. 11, 2011.

(51) Int. Cl.
*H04L 12/28* (2006.01)
*H04L 12/54* (2013.01)
*H04L 12/46* (2006.01)
*H04L 29/12* (2006.01)

(52) U.S. Cl.
CPC ............ *H04L 12/5692* (2013.01); *H04L 12/46* (2013.01); *H04L 61/103* (2013.01)

(58) Field of Classification Search
CPC .................. H04L 29/12009; H04L 29/12018; H04L 29/12028; H04L 61/10; H04L 61/103
See application file for complete search history.

(56) References Cited

U.S. PATENT DOCUMENTS

| | | | |
|---|---|---|---|
| 6,130,896 A | 10/2000 | Lueker et al. | |
| 6,272,551 B1 | 8/2001 | Martin et al. | |
| 6,421,751 B1 | 7/2002 | Gulick | |
| 6,465,927 B2 | 10/2002 | Shiraki et al. | |
| 6,765,927 B1 | 7/2004 | Martin et al. | |

(Continued)

FOREIGN PATENT DOCUMENTS

| | | |
|---|---|---|
| CN | 1753403 | 3/2006 |
| CN | 1845511 | 10/2006 |

(Continued)

OTHER PUBLICATIONS

Cisco Systems, Inc., , "Supported Platforms for Unique MAC Address Configuration on VLAN or L3 Interfaces for Catalyst Switches", URL: http://www.cisco.com/image/gif/paws/41263/catmac_41263.pdf retrieved on Feb. 13, 2013 Mar. 2, 2007 , pp. 1-7.

(Continued)

*Primary Examiner* — Alvin Zhu
(74) *Attorney, Agent, or Firm* — DeLizio Law, PLLC

(57) ABSTRACT

A hybrid network device can implement a frame delivery path selection mechanism for communicating with other network devices in a hybrid communication network. In one embodiment, the hybrid network device determines a preferred network interface among a plurality of network interfaces of the hybrid network device for communicating with a second network device. The hybrid network device determines an address associated with the preferred network interface of the hybrid network device. The hybrid network device transmits an address announcement message comprising an indication of the address associated with the preferred network interface from the hybrid network device to the second network device to cause the second network device to use the address associated with the preferred network interface for communicating with the hybrid network device.

25 Claims, 5 Drawing Sheets

(56) References Cited

U.S. PATENT DOCUMENTS

| | | | |
|---|---|---|---|
| 6,947,736 | B2 | 9/2005 | Shaver et al. |
| 7,082,134 | B1 | 7/2006 | Lim et al. |
| 7,113,763 | B2 | 9/2006 | Heinonen et al. |
| 7,262,695 | B2 | 8/2007 | Hicks |
| 7,269,403 | B1 | 9/2007 | Miao |
| 7,349,325 | B2 | 3/2008 | Trzeciak et al. |
| 7,391,317 | B2 | 6/2008 | Abraham et al. |
| 7,440,443 | B2 | 10/2008 | Logvinov et al. |
| 7,463,588 | B1 | 12/2008 | Tanaka et al. |
| 7,583,952 | B2 | 9/2009 | Lee et al. |
| 7,725,096 | B2 | 5/2010 | Riveiro et al. |
| 7,751,414 | B2 | 7/2010 | Lee et al. |
| 7,848,337 | B1 | 12/2010 | Weng et al. |
| 8,144,698 | B2 | 3/2012 | Sargor et al. |
| 8,284,694 | B2 | 10/2012 | Chari et al. |
| 8,619,769 | B2 | 12/2013 | Sandstrom |
| 8,897,169 | B2 | 11/2014 | Schrum, Jr. et al. |
| 9,025,603 | B2 | 5/2015 | Schrum |
| 2004/0078460 | A1 | 4/2004 | Valavi et al. |
| 2004/0133704 | A1 | 7/2004 | Krzyzanowski et al. |
| 2005/0013297 | A1 | 1/2005 | Eriksson |
| 2005/0265308 | A1 | 12/2005 | Barbir et al. |
| 2006/0153153 | A1 | 7/2006 | Bhagwat et al. |
| 2006/0212781 | A1 | 9/2006 | Hewitt et al. |
| 2006/0240799 | A1 | 10/2006 | Kim et al. |
| 2006/0245438 | A1 | 11/2006 | Sajassi et al. |
| 2006/0251115 | A1 | 11/2006 | Haque et al. |
| 2006/0274752 | A1* | 12/2006 | Jain et al. ............... 370/392 |
| 2007/0075843 | A1 | 4/2007 | Riveiro et al. |
| 2007/0076666 | A1 | 4/2007 | Riveiro et al. |
| 2007/0223399 | A1 | 9/2007 | Yang et al. |
| 2007/0229231 | A1 | 10/2007 | Hurwitz et al. |
| 2007/0280249 | A1 | 12/2007 | Draves, Jr. |
| 2008/0080380 | A1 | 4/2008 | Lee et al. |
| 2008/0130640 | A1 | 6/2008 | Hurwitz et al. |
| 2008/0285441 | A1* | 11/2008 | Abdulla et al. ............... 370/225 |
| 2008/0294967 | A1 | 11/2008 | Tomlinson et al. |
| 2008/0317039 | A1 | 12/2008 | Satterlee et al. |
| 2009/0040938 | A1 | 2/2009 | Klinker |
| 2009/0046723 | A1 | 2/2009 | Rahman et al. |
| 2009/0156159 | A1 | 6/2009 | Lim et al. |
| 2009/0160943 | A1 | 6/2009 | Badt, Jr. et al. |
| 2009/0163389 | A1 | 6/2009 | De Campo et al. |
| 2009/0245243 | A1 | 10/2009 | Rangarajan et al. |
| 2009/0252209 | A1 | 10/2009 | Riveiro et al. |
| 2009/0268668 | A1 | 10/2009 | Tinnakornsrisuphap et al. |
| 2009/0285216 | A1 | 11/2009 | Thubert et al. |
| 2009/0310610 | A1 | 12/2009 | Sandstrom |
| 2009/0316584 | A1 | 12/2009 | Tanaka et al. |
| 2009/0323829 | A1 | 12/2009 | Riveiro et al. |
| 2010/0202397 | A1 | 8/2010 | Chari et al. |
| 2010/0332631 | A1 | 12/2010 | Sekine et al. |
| 2011/0063992 | A1 | 3/2011 | Weng et al. |
| 2011/0116513 | A1 | 5/2011 | Gilson |
| 2011/0286326 | A1 | 11/2011 | Awano |
| 2011/0286457 | A1 | 11/2011 | Ee et al. |
| 2012/0033673 | A1 | 2/2012 | Goel |
| 2012/0163389 | A1 | 6/2012 | Zhang et al. |
| 2012/0224503 | A1 | 9/2012 | Schrum, Jr. et al. |
| 2012/0230343 | A1 | 9/2012 | Schrum, Jr. |
| 2013/0028135 | A1 | 1/2013 | Berman |
| 2013/0229909 | A1 | 9/2013 | Rahman et al. |

FOREIGN PATENT DOCUMENTS

| | | |
|---|---|---|
| CN | 1973520 | 5/2007 |
| CN | 101350818 | 1/2009 |
| CN | 103348637 A | 10/2013 |
| CN | 103403697 | 11/2013 |
| CN | 103416042 | 11/2013 |
| EP | 1170870 | 9/2002 |
| EP | 2673926 | 3/2015 |
| JP | 2008289146 | 11/2008 |
| JP | 2009253578 | 10/2009 |
| JP | 2010141845 | 6/2010 |
| KR | 1010110008270 | 10/2009 |
| KR | 20130121181 | 11/2013 |
| KR | 20130132629 | 12/2013 |
| KR | 20130136522 | 12/2013 |
| KR | 101494566 | 2/2015 |
| KR | 1502263 | 3/2015 |
| WO | 2009077292 | 6/2009 |
| WO | 2012109622 | 8/2012 |
| WO | 2012118531 | 9/2012 |

OTHER PUBLICATIONS

IEEE P1905.1 TM/WDxx.xx.xx Working Document Draft Standard for a Convergent Digital Home Network for Heterogeneous Technologies, 2011.
"PCT Application No. PCT/US2012/028254 Written Opinion of the IPEA", Feb. 18, 2013, 10 pages.
"Chinese Application No. 201280007959.7 First Office Action", Apr. 20, 2015, 16 pages.
"Chinese Patent Application No. 201180068749.4, Office Action", May 4, 2015, 16 pages.
"Korean Patent Application No. 2013-7023974, KIPO Notice of Grounds for Rejection", Mar. 26, 2015, 8 pages.
"Japanese Patent Application No. 2013-556607, Office Action", Jan. 6, 2015, 4 pages.
"U.S. Appl. No. 13/189,272 Office Action", Mar. 26, 2014, 60 Pages.
"U.S. Appl. No. 13/189,272 Office Action", Apr. 25, 2013, 49 Pages.
"U.S. Appl. No. 13/197,275 Final Office Action", Apr. 24, 2014, 10 pages.
"PCT Application No. PCT/US2012/024763 International Preliminary Report on Patentability", Jun. 18, 2013, 8 pages.
"PCT Application No. PCT/US2012/028254 International Preliminary Report on Patentability", May 10, 2013, 11 pages.
"European Application No. 11859662.6, European Search Report", Jul. 17, 2014, 9 pages.
"Korean Patent Application No. 2013-7023974, KIPO Notice of Grounds for Rejection", Jul. 16, 2014, 7 pages.
"Korean Patent Application No. 2013-7026010, KIPO Notice of Preliminary Rejection", Jul. 21, 2014, 12 pages.
"Korean Patent Application No. 2013-7026320, Notice of Grounds for Rejection", Aug. 11, 2014, 9 pages.
"TCP/IP Tutorial and Technical Overview", TCP/IP Tutorial and Technical Overview, XX, XX, Aug. 1, 2001, pp. 180-197.
"U.S. Appl. No. 13/189,272 Final Office Action", Aug. 1, 2014, 65 Pages.
Xi, et al., "Wireless Nultihop Internet Access: Gateway Discovery, Routing, and Addressing", Proceedings. International Conference on Third Generation Wireless and Beyond, May 28, 2002, pp. 1-6.
"PCT Application No. PCT/US2011/058506 International Preliminary Report on Patentability", Jul. 12, 2013, 10 pages.
"U.S. Appl. No. 13/189,272 Final Office Action", Sep. 19, 2013, 60 Pages.
"U.S. Appl. No. 13/197,275 Office Action", Sep. 20, 2013, 27 pages.
"Implementation of Extended ARP and High Performance LAN Communication in Linux Kernel", Technical Report of the Institute Electronics, Information and Communication Engineers, Feb. 7, 2002, vol. 101 No. 639, pp. 33-38.
"Japanese Patent Application No. 2013-553624, Office Action", Nov. 11, 2014, 6 pages.
"Japanese Patent Application No. 2013-557860, Office Action", Nov. 4, 2014, 6 pages.
Blanchet M., et al., "Multiple Interfaces and Provisioning Domains Problem Statement; draft-ietf-mif-problem-statement-09.txt", Internet Engineering Task Force, IETF; Standardworkingdraft, Internet Society (!SOC) 4, Rue Des Falaises CH—1205 Geneva, Switzerland, No. 9, Oct. 25, 2010, pp. 1-18, XP015072215, [retrieved on Oct. 25, 2010] Sections 3 to 5 (incl. sub-sections).
Hong, Y.G (ETRI, Korea): "Output document of Y.ipv6-vmh "Framework of vertical multi-homing in IPv6-based NGN"";TD 565 (NGN-GSI), ITU-T Drafts ; Study Period 2009-2012, International Telecommunication Union, Geneva ; CH, vol. ngn-gsi ; 7/13, Sep. 16, 2010, pp. 1-19, XP917565748, [retrieved on Sep. 16, 2010] p. 7-p. 18.

(56) References Cited

OTHER PUBLICATIONS

International Search Report and Written Opinion—PCT/US2012/024763—ISAEPO—Apr. 18, 2012.
International Search Report and Written Opinion—PCT/US2012/028254—ISA/EPO—Sep. 6, 2012.
Wasserman M., et al., "Current Practices for Multiple Interface Hosts; draft-ietf-mif-current-practices-98.txt", Internet Engineering Task Force, IETF; Standardworkingdraft, Internet Society (ISOC) 4, Rue Des Falaises CH—1205 Geneva, Switzerland, No. 8, Feb. 28, 2011, pp. 1-23, XP015074156, [retrieved on Feb. 28, 2011] Sections 1 to 3 (incl. sub-sections).
"Standard for a Convergent Digital Home Network for Heterogeneous Technologies", IEEE P1905.1 Project Authorization Request (PAR). Available from IEEE. Authorizes a standards development project to define an "abstraction layer" that provides a single common interface to upper layers for devices that implement multiple networking interfaces. Nov. 8, 2010.

IEEE, "Wireless LAN Medium Access Control (MAC) and Physical Layer (PHY) Specifications", IEEE Std 802.11-2007 (Revision of IEEE Std 802.11-1999 ) http://www.ahltek.com/WhitePaperspdf/802.11-20%20specs/802.11-2007.pdf Jun. 12, 2007 , 1232 pages.
Microsoft, "MS-LLTD Link Layer Topology Discovery (LLTD) Protocol Specification", http://msdn.microsoft.com/en-us/library/cc233983(v=prot.10).aspx Feb. 4, 2011 , 128 pages.
Volokitin,Yuriy , "LanTopolog", http://www.lantopolog.com/ Date Obtained from the Internet: Mar. 2, 2011 2007 , 2 pages.
Co-pending U.S. Appl. No. 13/189,272, filed Jul. 22, 2011, 40 pages.
Co-pending U.S. Appl. No. 13/197,275, filed Aug. 3, 2011, 37 pages.
"HomePlug AV Specification", Version 1.1. Available from HomePlug Powerline Alliance http://www.homeplug.org May 21, 2007.
International Search Report and Written Opinion—PCT/US2011/058506—ISA/EPO—Feb. 7, 2012.

* cited by examiner

US 9,300,491 B2

FRAME DELIVERY PATH SELECTION IN HYBRID COMMUNICATION NETWORKS

RELATED APPLICATIONS

This application claims priority to U.S. Provisional Application Ser. No. 61/441,938 filed on Feb. 11, 2011, entitled "FRAME DELIVERY PATH SELECTION IN HYBRID COMMUNICATION NETWORKS."

BACKGROUND

Embodiments of the inventive subject matter generally relate to the field of communication systems and, more particularly, to frame delivery path selection in hybrid communication networks.

Hybrid communication networks typically comprise multiple networking technologies (e.g., wireless local area network (WLAN) technologies, powerline communication technologies, Ethernet, etc.) that are interconnected using bridging-capable devices that forward packets between devices utilizing the different network technologies and media in order to form a single extended communication network. Typically, the communication mechanisms and protocol specifics (e.g., device and topology discovery protocols, bridging protocols, etc.) are unique to each networking technology. The hybrid communication network can comprise hybrid communication devices and conventional (or legacy) communication devices. The conventional communication devices typically implement a single networking interface that supports a single communication protocol (e.g., Internet Protocol—IPv4 or IPv6). The hybrid communication devices typically comprise multiple communication interfaces (e.g., each of which can support different communication technologies) that are configured to operate across multiple networking technologies.

SUMMARY

Various embodiments of frame delivery path selection in hybrid communication networks are disclosed. In one embodiment, a preferred network interface is determined among a plurality of network interfaces of a first network device for communicating with a second network device of a communication network. An address associated with the preferred network interface of the first network device is determined. An address announcement message comprising an indication of the address associated with the preferred network interface is transmitted from the first network device to the second network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
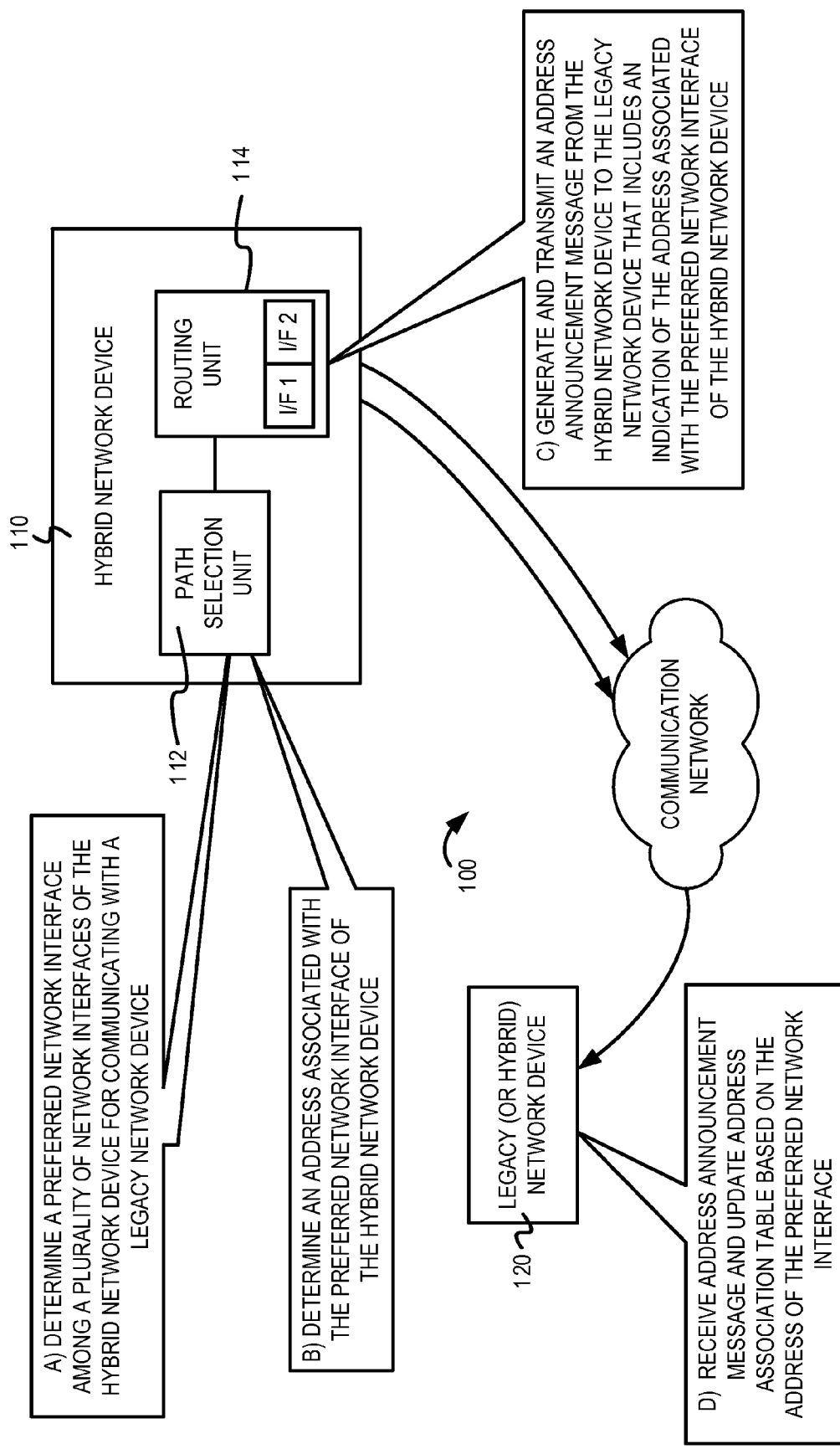
FIG. 1 is an example block diagram illustrating one embodiment of a frame delivery path selection mechanism for hybrid communication networks.

The description that follows includes exemplary systems, methods, techniques, instruction sequences, and computer program products that embody techniques of the present inventive subject matter. However, it is understood that the described embodiments may be practiced without these specific details. For instance, although in some embodiments the frame delivery path selection mechanism can be implemented for hybrid communication networks comprising wireless local area network (WLAN) devices (e.g., IEEE 802.11), powerline network devices (e.g., Homeplug AV), coax network devices (MoCA), and Ethernet devices, in other embodiments the frame delivery path selection mechanism can be implemented in hybrid communication networks that may comprise other suitable types of network devices that implement other standards/protocols (e.g., WiMAX). In other instances, well-known instruction instances, protocols, structures, and techniques have not been shown in detail in order not to obfuscate the description.

A hybrid communication network is typically formed as an interconnection of communication network segments (sub-networks) across different network technologies and communication media. The hybrid communication network typically comprises multi-interface communication devices ("hybrid network devices") that are configured to operate across multiple networking technologies as well as conventional, single-interface communication devices ("legacy network devices"). Each of the multiple network interfaces of a hybrid network device is associated with a medium access control address (e.g., a MAC address). However, the hybrid network device typically comprises one address associated with the network layer (e.g., an Internet Protocol (IP) address) of an Open Systems Interconnection (OSI) protocol stack, and therefore a one-to-one mapping between the network layer address and the MAC address may not exist. From the perspective of the upper layers in the OSI protocol stack (e.g., the application layer, the network layer, etc.), the hybrid network device implementing multiple communication interfaces can appear to have a single underlying MAC layer and a single physical layer (i.e., a single MAC/PHY layer) and consequently a single MAC address. In some cases, when the hybrid network device receives address resolution protocol (ARP) requests from other network devices in the hybrid communication network (e.g., a legacy device or another hybrid device), the hybrid network device typically sends an ARP response including the MAC address of a single network interface (e.g., a default network interface) to all the requesting network devices, even though the hybrid network device includes multiple network interfaces. Therefore, when other network devices in the hybrid communication network communicate with the hybrid network device, the other network devices utilize a single destination MAC address in the destination MAC address field (corresponding to the default network interface of the hybrid network device) for all communications with the hybrid network device. The other network devices may not be aware the hybrid network device has multiple network interfaces, may not have the capabilities to determine a preferred network interface for communicating with the hybrid network device, and/or may be configured to utilize a single destination MAC address (e.g., associated with default network interface) for all communications with the hybrid network device (e.g., based on previous communications with the hybrid network device). For example, a legacy network device with powerline communication capabilities may be configured to communicate (e.g., based on ARP messages) with a single network interface (e.g., an Ethernet interface) of a hybrid network device without being aware of, and without having the capabilities to discover, the other network interface(s) of the hybrid network device (e.g., a WLAN 802.11 interface). By announcing a single MAC address associated with a single network interface of a hybrid device to the hybrid communication network (e.g., via ARP messages) when multiple network interfaces are available, network devices may limit their throughput and performance. This may also introduce reliability concerns by not utilizing an alternative network path for communications when a failure in one or more segments of the network is suspected, for example.

In some embodiments, a frame delivery path selection scheme can be implemented by each hybrid network device in a hybrid communication network for determining and designating one of the plurality of available network interfaces as the preferred network interface for communications with another network device (legacy or hybrid). Each hybrid network device can announce the preferred network interface (e.g., via ARP messages) to the other network devices to cause the other network devices to use the address of the preferred network interface when transmitting packets to the hybrid network device. The preferred network interface that is selected for communications from one network device can be different than the preferred network interface that is selected for communications from another network device. The frame delivery path selection scheme may allow a target hybrid network device to control which destination MAC address a source legacy (or hybrid) network device uses when transmitting packets to the target hybrid network device, and therefore may allow the target hybrid network device to control which network path is used to deliver the packets to the target hybrid network device. The frame delivery path selection scheme may allow network devices to improve throughput and performance, and may also address reliability concerns by allowing hybrid network devices to change the preferred network interface for receiving communications from other network devices.

FIG. 1 is an example block diagram illustrating one embodiment of a frame delivery path selection mechanism for hybrid communication networks. FIG. 1 depicts a hybrid communication network 100 comprising a hybrid network device 110 and a legacy network device 120. It is noted, however, that in some examples the network device 120 may also be another hybrid network device. The hybrid network device 110 comprises an path selection unit 112 and a routing unit 114. In some implementations, the path selection unit 112 and the routing unit 114 may be implemented in one or more communication units of the hybrid network device 110 that implement protocols and functionality to enable communications via the hybrid communication network 100. AS illustrated, the routing unit 114 comprises two or more network interfaces (e.g., network interfaces I/F 1 and I/F 2). In some implementations, the hybrid network device 110 and the network device 120 can each be an electronic device, such as a laptop computer, a tablet computer, a mobile phone, a smart appliance, a gaming console, a desktop computer, or another suitable electronic device. In some embodiments, as will be described below in stages A-D of FIG. 1, the path selection unit 112 and the routing unit 114 of the hybrid network device 110 can implement functionality to determine a preferred network interface associated with the hybrid network device 110 for communications associated with the legacy network device 120 (and also other network devices), and to announce the preferred network interface to the legacy network device 120 in the communication network.

At stage A, the path selection unit 112 of the hybrid network device 110 determines a preferred network interface among a plurality of available network interfaces (e.g., I/F 1 and I/F 2) for communicating with the legacy network device 120. For example, the path selection unit 112 can determine the preferred network interface in response to detecting an address request message from the legacy network device 120. In one example, the address request message may be an ARP request received from the legacy network device 120. The path selection unit 112 can also determine the preferred network interface for communicating with the legacy network device 120 based on other criteria or other triggers (besides receiving an address request message); for example, the path selection unit 112 can unilaterally determine the preferred network interface when the hybrid network device 110 is initiated, for load balancing reasons, in response to detecting changing network conditions, etc., as will be further described below.

In some implementations, the hybrid network device 110 and the legacy network device 120 can implement the OSI protocol stack. In these implementations, from the perspective of the upper protocol layers (e.g., the network layer, the transport layer, and the application layer) of the OSI protocol stack, the hybrid network device 110 can appear to comprise a single underlying MAC/PHY layer (i.e., lower level layers) with a single corresponding MAC address. However, in some embodiments, the hybrid network device 110 can implement a "hybrid adaptation layer" between the network layer and the MAC layers (corresponding to the multiple network interfaces) of the hybrid network device 110. The hybrid adaptation layer can implement functionality for managing communications in the hybrid network device with a single set of upper protocol layers (e.g., a single network layer and transport layer) but with multiple networking interfaces (e.g., multiple PHY layers and MAC layers). The hybrid adaptation layer can enable the upper protocol layers to operate as if the hybrid network device 110 comprises only a single MAC layer and a corresponding single PHY layer. The hybrid adaptation layer can interface with the underlying MAC layers to manage networking resources and manage the frame delivery path selection operations for the hybrid network device 110, while remaining transparent to the upper protocol layers. In some implementations, the hybrid adaptation layer can comprise the path selection unit 112 and the routing unit 114 for managing the address announcement operations and other functionality associated with the frame delivery path selection mechanism of the hybrid network device 110. For example, the path selection unit 112 of the hybrid adaptation layer can intercept the address requests messages received from other network devices that are typically sent to the network layer of the protocol stack, and then determine the preferred network interface. The path selection unit 112 and the routing unit 114 of the hybrid adaptation layer can also perform other operations associated with the frame delivery path selection mechanism, such as detecting changing network conditions, performing load balancing operations, generating the address announcement messages, etc., as will be further described below. It is noted, however, that in other embodiments the path selection unit 112 and/or the routing unit 114 may be implemented in other layers of the protocol stack (e.g., the network layer), and/or may be implemented using other device modules or components that are not explicitly shown in FIG. 1 that are associated with the hybrid network device 110 (e.g., one or more processor and memory units).

In some embodiments, the path selection unit 112 is configured to determine the preferred network interface among the plurality of network interfaces of the hybrid network device 110 based on the timing of the address request messages received at the plurality of network interfaces of the hybrid network device 110 from another network device (e.g., the legacy network device 120). In one implementation, the path selection unit 112 can designate the network interface that received the first copy of the address request message set from the legacy network device 120 as the preferred network interface. For example, the legacy network device 120 can broadcast an address request message (e.g., an ARP request message) to the hybrid network device 110 via a single network interface that is addressed to the network address (i.e., layer 3 address) associated with the hybrid network device 110 (e.g., an Internet Protocol version 4 (IPv4) address, IP version 6 (IPv6) address, an AppleTalk address, or another suitable network address depending on the corresponding network layer protocol that is implemented). The address request message is copied by forwarding devices (e.g., bridge devices) of the hybrid communication network, and each copy of the address request message is forwarded to the different network segments of the network, such that the hybrid network device 110 can receive a copy of the address request message at each of the network interfaces. For example, if the legacy network device 120 is a network device with powerline communication capabilities and the hybrid network device 110 includes an Ethernet interface (e.g., I/F 1) and an 802.11 WLAN interface (e.g., I/F 2), the address request message sent via the powerline communication network can be replicated and forwarded by bridge devices to the Ethernet and WLAN interfaces of the hybrid network device 110. In one implementation, the path selection unit 112 can determine which copy of the address request message was received first at the hybrid network device 110, and designate the network interface associated with the address request message that was received first as the preferred network interface, as will be further described below with reference to FIG. 2. The address request message that was received first at the hybrid network device 110 typically had the shortest time in transit, and therefore the corresponding network interface can be selected as the preferred network interface. In some implementations, the path selection unit 112 can determine the preferred network interfaces based on which network interface received the first copy of the address request message and/or based on other criteria (e.g., based on load balancing techniques, based on detected network conditions, etc.), as will be further described below with reference to FIGS. 2-3.

At stage B, the path selection unit 112 determines an address associated with the preferred network interface of the hybrid network device 110. For example, the path selection unit 112 determines the MAC address (i.e., the layer 2 or link layer address) associated with the preferred network interface of the hybrid network device 110 for communicating with the legacy network device 120, which was selected based on one of the techniques described above (in stage A). The hybrid network device 110 includes a plurality of network interfaces, each having a separate MAC address. In the example described above in stage A, if the hybrid network device 110 includes an Ethernet interface and an 802.11 WLAN interface, and if the path selection unit 112 designates the 802.11 WLAN interface as the preferred network interface, then the path selection unit 112 will determine the MAC address associated with the 802.11 WLAN interface.

At stage C, the routing unit 114 generates and transmits an address announcement message from the hybrid network device 110 to the legacy network device 120 including an indication of the address associated with the preferred network interface of the hybrid network device 110. In one example, the routing unit 114 can generate the address announcement message (e.g., an ARP response message) in response to receiving an address request message (e.g., an ARP request message). In another example, the routing unit 114 can generate the address announcement message unilaterally (e.g., a gratuitous ARP) based on other triggers or other criteria (e.g., when the device is initiated, based on a periodic announcement schedule, for load balancing reasons, etc.), as will be further described below in FIGS. 2-3. In some implementations, routing unit 114 can transmit the address announcement message to the legacy network device 120 via the preferred network interface. In this case, the indication of the MAC address associated with the preferred network interface is the source MAC address of the address announcement message. It is noted, however, that in other implementations the MAC address of the preferred network interface can be indicated by other techniques; for example, the indication of the MAC address associated with the preferred network interface can also be a plurality of bits (e.g., unused bits or extra bits) in the header (or payload) of the address announcement message.

At stage D, the legacy network device 120 receives the address announcement message from the hybrid network device 110 and detects the indication of the address associated with the preferred network interface of the hybrid network device 110. For example, the legacy network device 120 can identify the source MAC address associated with the address announcement message and determine that the source MAC address is the address associated with the preferred network interface that the hybrid network device 110 selected for communications with the legacy network device 120. In another example, the legacy network device 120 can identify the MAC address associated with the preferred network interface of the hybrid network device 110 by reading a plurality of added bits in the header of the address announcement message. The legacy network device 120 can then update an address association table (e.g., implemented by a routing unit of the legacy network device 120) that stores the association of network address to MAC address of the different network devices in hybrid communication network 100. In the example described above, the legacy network device 120 can update the MAC address associated with the network address of the hybrid network device 110 such that the legacy network device 120 uses the MAC address of the preferred network interface selected by the hybrid network device 110 when communicating with the hybrid network device 110. In this manner, the hybrid network device 110 can control which destination MAC address is added to packets transmitted from the legacy network device 120 to the hybrid network device, and therefore control which network path the packets are sent via the hybrid communication network 100. For example, in the example described above, if the preferred network interface of the hybrid network device 110 is the 802.11 WLAN interface (e.g., I/F 2), the legacy network device 120 with powerline communication capabilities can transmit packets including the MAC address of the 802.11 WLAN interface as the destination MAC address. In this example, the packets would be sent via the powerline communication network to a bridging device that would use 802.11 WLAN to forward the packets to the 802.11 WLAN interface of the hybrid network device 110.

It is noted that the hybrid network device 110 may designate different preferred network interfaces for different network devices of the hybrid communication network. For each network device, the hybrid network device 110 can determine the preferred network interface for receiving communications from the corresponding network device based on the timing of the address request messages, load balancing operations, detected channel conditions, network topology considerations, etc., as will be further described below. The hybrid network device 110 can then send an address announcement message to each of the network devices to inform each network device of the preferred network interface that was selected by the hybrid network device 110.

Figure 2:
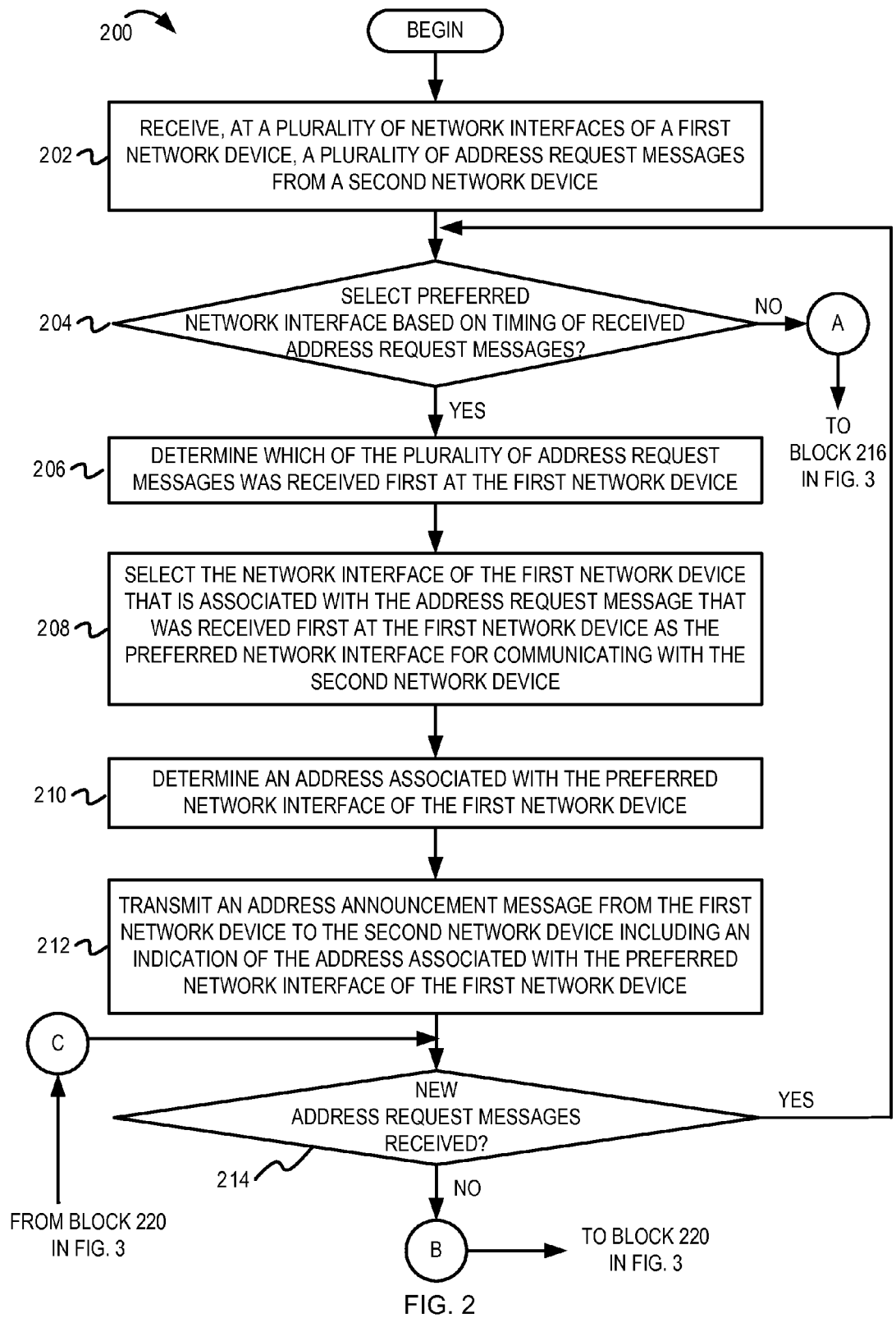
FIG. 2 depicts a flow diagram of example operations of a frame delivery path selection mechanism for a hybrid communication network.
Figure 3:
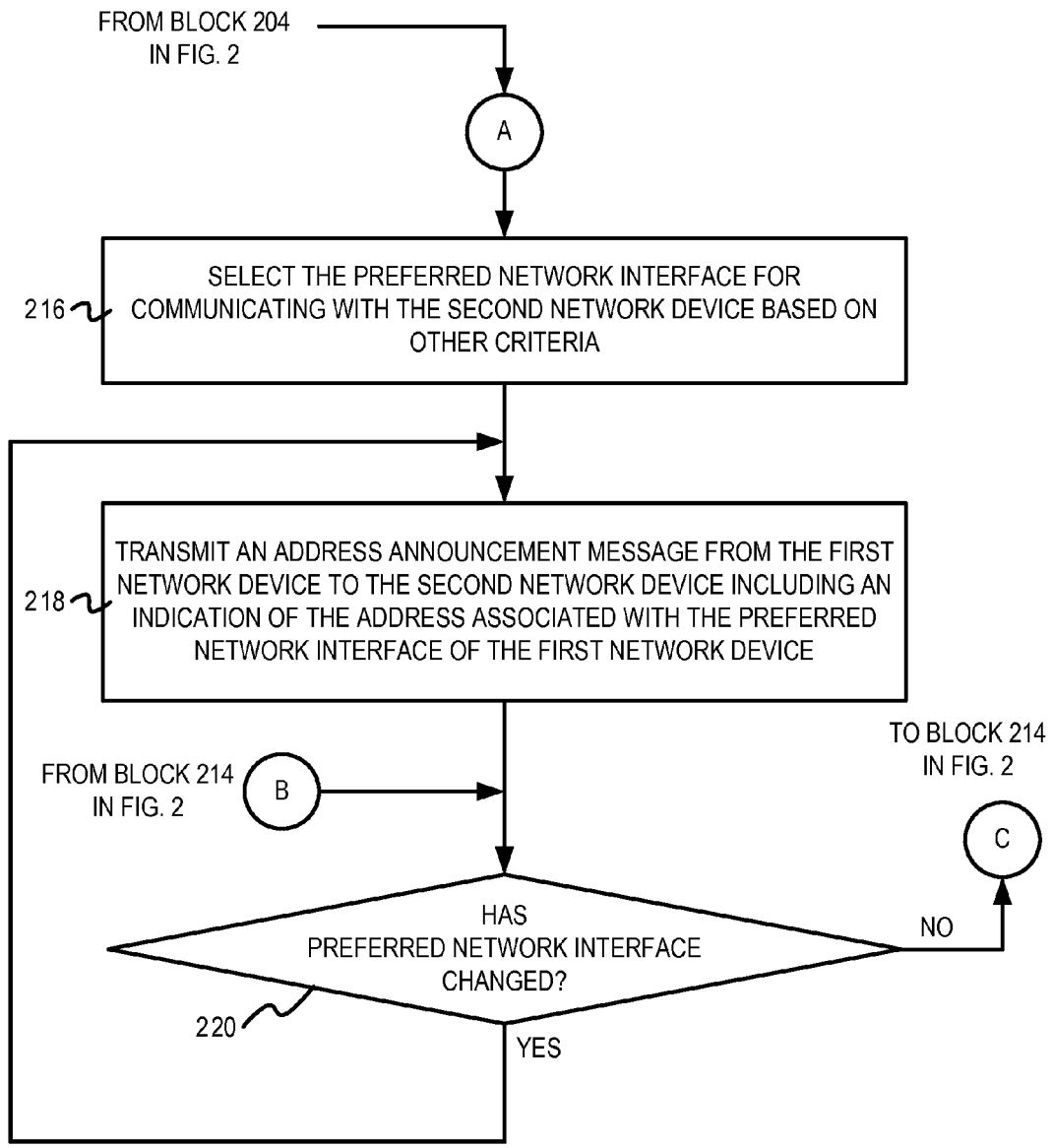
FIG. 3 depicts a flow diagram of additional example operations of the frame delivery path selection mechanism for the hybrid communication network.

FIGS. 2 and 3 depict a flow diagram ("flow") 200 of example operations of a frame delivery path selection mechanism for a hybrid communication network. The flow 200 begins at block 202.

At block 202, a plurality of address request messages are received at a plurality of network interfaces of a first network device from a second network device. For example, the routing unit of the first network device (e.g., the routing unit 114 of the hybrid network device 110 shown in FIG. 1) can receive a plurality of address request messages (e.g., ARP request messages) from a second network device (e.g., the legacy network device 120) via a plurality of network interfaces (e.g., network interfaces I/F 1 and I/F 2). As described above, the plurality of address request messages may be copies of a single address request message that was generated at the second network device and distributed to various (or all) the network segments of the hybrid communication network via forwarding network devices (e.g., network bridges). The first network device can determine that the network interfaces that received an address request message are usable for communicating with the second network device. The flow continues at block 204.

At block 204, it is determined whether to select the preferred network interface associated with the first network device for communicating with the second network device based on the timing of the received address request messages. In some embodiments, the path selection unit of the first network device (e.g., the path selection unit 112 of the hybrid network device 110) can determine whether to select the preferred network interface associated with the first network device based on the timing of the received address request messages (e.g., based on which of the address request messages was received first at the first network device). In one example, the path selection unit may determine to select the preferred network interface based on the timing of the received address request messages if a preferred network interface has not been determined recently (e.g., within a predefined amount of time). In some cases, the first network device may have recently determined a preferred network interface based on a previous set of address request messages sent by the second network device, or based on other criteria or other triggers (e.g., when the first device is initiated, for load balancing reasons, in response to detecting changing channel conditions, according to a periodic address announcement schedule, etc., as will be further described below). In some examples, the path selection unit may determine to select the preferred network interface based on the timing of the received address request messages regardless of whether a preferred network interface has been previously determined, in order to verify the previously selected interface is still the preferred network interface for communicating with the second network device. Since the preferred network interface for communicating with a target network device can change in a hybrid communication network, the first network device can verify the preferred network interface with each set of address request messages it receives, and also based on other criteria and triggers (e.g., for load balancing reasons, in response to detecting changing channel conditions, etc.). If it is determined to select the preferred network interface based on the timing of the received address request messages, the flow continues at block 206. Otherwise, the flow continues at block 216 of FIG. 3.

At block 206, it is determined which of the plurality of address request messages was received first at the first network device. For example, the path selection unit of the first network device can determine which of the plurality of address request messages was received first at the first network device. The path selection unit also determines which network interface of the plurality of network interfaces of the first network device is associated with the address request message that was received first at the first network device. For example, the path selection unit may monitor the different interfaces of the first network device to determine which interface receives a copy of the address request message first. In one specific example, the path selection unit can monitor one or more receive queues or buffers to detect which address request message was received first and at which interface. It is noted, however, that the path selection unit may determine which address request message was received first by other techniques (e.g., based on timestamp information in the header of the address request message). After block 206, the flow continues at block 208.

At block 208, the network interface of the first network device that is associated with the address request message that was received first at the first network device is selected as the preferred network interface for communicating with the second network device. For example, after determining which network interface of the plurality of network interfaces of the first network device is associated with the address request message that was received first at the first network device, the path selection unit designates this interface as the preferred network interface. After block 208, the flow continues at block 210.

At block 210, an address associated with the preferred network interface of the first network device is determined. For example, the path selection unit of the first network device determines the MAC address associated with the preferred network interface that was selected for communicating with the second network device. As described above, each network interface of a hybrid network device is associated with a different MAC address. In one implementation, the path selection unit may update or populate a data store or register (or other storage mechanism) to keep a record of the MAC address of the preferred network interface. After block 210, the flow continues at block 212.

At block 212, an address announcement message is transmitted from the first network device to the second network device including an indication of the address associated with the preferred network interface of the first network device. For example, the routing unit of the first network device generates and transmits an address announcement message (e.g., an ARP response message) to the second network device indicating the MAC address of the preferred network interface that was selected based on the timing of the address request messages received from the second network device. As described above in FIG. 1, in some implementation, the routing unit transmits the address announcement message to the second network device via the preferred network interface. In this matter, the first network device can attempt to ensure that the second network device uses the MAC address of the preferred network interface as the destination MAC address when transmitting packets to the first network device. After block 212, the flow continues at block 214.

At block 214, it is determined whether new address request messages are received at the first network device. For example, the routing unit continuously monitors whether it receives new address request messages at any of the network interfaces of the first network device. If new address request messages are received, the flow loops back to block 204, where it determines whether to select a new preferred network interface based on the timing of the newly received address request messages. Otherwise, the flow continues to block 220 of FIG. 3, where it is determined whether the preferred network interface has been changed based on other criteria or other triggers. In some implementations, when the hybrid network device uses the timing of the address request messages to select the preferred network interface, the hybrid network device can implement techniques to determine whether a received address request message is part of a first set of address request messages or part of a second (or new) set of address request messages. For example, this can avoid a situation where the hybrid network device determining that an address request message that was the last one received in the first set of address request messages was the first one received in the second set of address request messages, which would likely select an incorrect preferred network interface. In one implementation, when a new address request message is received, the routing unit can determine whether an address request message has not been received for a duration that exceeds the maximum possible frame flight time. In this implementation, if an address request message has not been received for a duration that exceeds the maximum possible frame flight time, the path selection unit can use (or have the option of using) the new address request messages to determine the preferred network interface. However, in this implementation, if an address request message was received within the duration associated with the maximum possible frame flight time, the routing unit may ignore the new address request message. In another implementation, the hybrid network device can use frame fields present in the address request messages that uniquely identify the frames associated with each set of address request messages; for example, the hybrid device can read protocol sequence numbers that are updated with each execution of the protocol or with each transmission to distinguish between address request messages from the same or different transmissions.

At block 216, in response to determining that the address request messages will not be used to determine the preferred network interface (block 204), the preferred network interface is selected based on other criteria. In some implementations, the path selection unit may determine not to use the timing of the address request messages to select a new preferred network interface if a preferred network interface has been selected recently (e.g., within a predefined amount of time) based on one or more of the techniques described herein (e.g., described above with reference to block 204 or described below). In another example, the path selection unit may determine not to use the timing of the address request messages since the preferred network interfaces that is currently being used is reliable and/or the network technology associated with the preferred network interface is the preferred technology of choice for certain transmissions. In these cases, the path selection unit may just access the data store or register where the MAC address of the preferred network interface is stored. In some implementations, the path selection unit of the first network device selects the preferred network interface (or a new preferred network interface) based on other criteria, such as load balancing specifications, network conditions, etc., and then determines the address of the preferred network interface that is selected. In one implementation, the first network device can detect the current network loading associated with the various network interfaces of the first network device and the corresponding network paths (e.g., by communicating with other hybrid network devices in the network) to determine the preferred network interface for communicating with the second network device. For example, if the path selection unit determines that certain network interfaces of the first network device and/or the corresponding network paths are highly loaded (e.g., above a predefined throughput threshold) or overloaded (e.g., above a predefined overload threshold), the path selection unit can avoid selecting these network interfaces if there are other available interfaces for communicating with the second network device to perform load balancing. In one implementation, the first network device can detect other network conditions (e.g., network errors, network device failures, network path unavailability, new network path establishment, etc.) to determine the preferred network interface for communicating with the second network device. For example, the first network device can send topology discovery announcements, topology discovery test frames, or communicate with other hybrid network devices by other methods to detect the network conditions. Based on this network analysis, the first network device can avoid selecting a network interface that is associated with a network segment that is experiencing problems. It is noted that the path selection unit may utilize two or more of the methods described above to determine the preferred network interface; for example, the path selection unit can utilize the timing of address request messages, network loading, and detection of changing channel conditions for determining the preferred network interface (and/or to eliminate some network interfaces from consideration). Also, in some embodiments, the first network device can determine the preferred network interface after the first network device is initiated. After block 216, the flow continues at block 218.

At block 218, an address announcement message is transmitted from the first network device to the second network device including an indication of the address associated with the preferred network interface of the first network device. For example, in response to determining that the timing of the address request messages will not be used to determine the preferred network interface (block 204), and the preferred network interface is selected based on other criteria (block 216), the routing unit of the first network device generates and transmits an address announcement message (e.g., an ARP response message) to the second network device indicating the MAC address of the preferred network interface (selected at block 216). In some examples, after block 214 (and after block 218), the path selection unit of the first network device can continuously or periodically determine whether the preferred network interface changes based on one or more of the techniques described herein, as will be further described below with reference to block 220. In response to determining that the preferred network interface has changed, the path selection unit selects a new preferred network interface and the routing unit transmits an address announcement message unilaterally from the first network device to the second network device. In some implementations, after the first network device is initiated, the preferred network interface is determined and an address announcement message is unilaterally transmitted to the second network device (and also to the rest of the devices in the network). In some embodiments, when a device is discovered in the network, the preferred network interface is determined for communicating with the discovered network device, and an address announcement message is unilaterally transmitted to the discovered network device. As described above, in some implementation, the routing unit transmits the address announcement message to the second network device via the preferred network interface. After block 218, the flow continues at block 220.

At block 220, it is determined whether the preferred network interface has changed. For example, after block 214 of FIG. 2 (or after block 218), the path selection unit of the first network device can determine whether the preferred network interface has changed based on other criteria besides the timing of address request messages, such as load balancing specifications, network conditions, and other criteria described herein. In some implementations, the first network device may implement a periodic address announcement schedule for announcing the preferred network interface to the second network device (and also to other network devices) unilaterally without waiting for address request messages. In order to implement the periodic address announcement schedule, the path selection unit may periodically determine whether the preferred network interface has changed (based on one of the techniques described herein), and the routing unit can send out an address announcement message unilaterally to the second network device indicating the MAC address of the new preferred network interface if the preferred network interface has changed. In some implementations, the path selection unit may continuously verify that the preferred network interface has not changed, and send out address announcement messages unilaterally as needed when it detects the preferred network interface has changed. If it is determined that the preferred network interface has changed, the flow loops back to block 218, where an address announcement message is transmitted to the second network device. If it is determined that the preferred network interface has not changed, the flow loops back to block 214 of FIG. 2, where the first network device continues to monitor whether it receives a new set of address request messages from the second network device (or other network devices).

Figure 4:
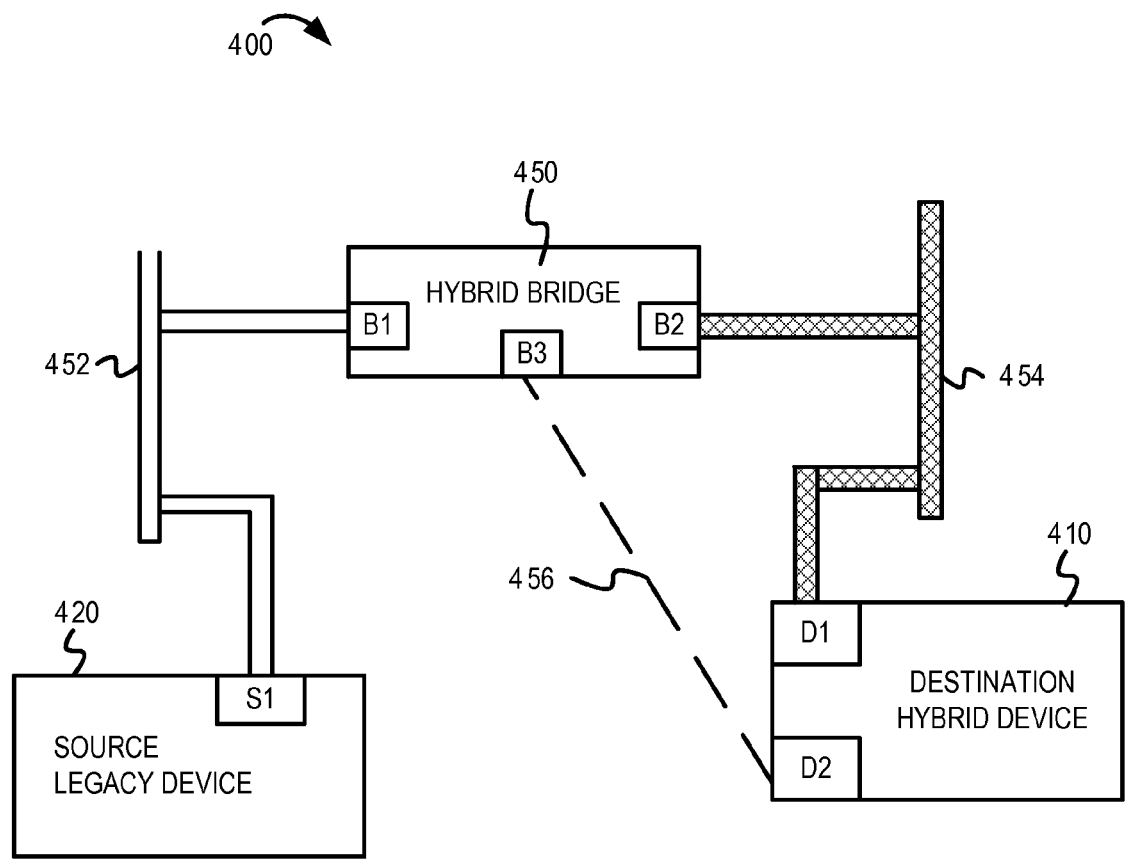
FIG. 4 is an example conceptual diagram illustrating a frame delivery path selection mechanism for a hybrid communication network.

FIG. 4 is an example conceptual diagram illustrating a frame delivery path selection mechanism for a hybrid communication network. As shown in FIG. 4, in one example, a source legacy device 420 is coupled to a destination hybrid device 410 via one or more network forwarding devices in the hybrid communication network 400, such as a hybrid bridge 450. It is noted, however, that in other examples the source device may be a source hybrid device, and/or the functionality of the hybrid bridge 450 may be implemented by two or more forwarding devices in the network 400. The source legacy device 420 comprises a single network interface S1, while the destination hybrid device 410 comprises two network interfaces D1 and D2. Also, the hybrid bridge 450 comprises three network interfaces B1, B2, and B3. The hybrid communication network 400 of FIG. 4 comprises an interconnection of three communication networks—a powerline communication network 452, an Ethernet network 454, and a wireless communication network 456. As shown, the source legacy device 420 and the hybrid bridge 450 are coupled with the powerline communication network 452 via interfaces S1 and B1 respectively. The destination hybrid device 410 and the hybrid bridge 450 are coupled with the Ethernet network 454 via interfaces D1 and B2 respectively, and are coupled with the wireless communication network 456 via interfaces D2 and B3 respectively. As described above with reference to FIGS. 1-3, the destination hybrid device 410 may be configured to implement a frame delivery path selection mechanism to determine and designate a preferred network interface for communications associated with the source legacy device 420. The path selection unit of the destination hybrid device 410 may determine the preferred network interface (e.g., based on the timing of received address request messages, based on load balancing operations, etc.) and then send an address announcement message to the source legacy device 420 to cause the source legacy device 420 to use the preferred network interface when sending packets to the destination hybrid device 410. For example, the path selection unit of the destination hybrid device 420 can determine that the wireless network interface D2 (e.g., a 802.11 WLAN interface) is the preferred network interface, and may send an address announcement message to the source legacy device 420 indicating the MAC address associated with the wireless network interface D2. The source legacy device 420 can then update an address association table that stores the association of network address to MAC address of the different network devices in the hybrid communication network 400 to store the MAC address of the preferred network interface of the destination hybrid device 410. When the source legacy device 420 sends packets to the destination hybrid device 410, the source legacy device 420 would use the MAC address of the preferred network interface (e.g., the wireless network interface D2) and the corresponding network path for the transmission. In this example, the packets would be transmitted from the network interface S1 of the source legacy device 420 to the network interface B1 of the hybrid bridge 450, which would then forward the packets from the network interface B3 to the network interface D2 of the destination hybrid device 410.

It should be understood that FIGS. 1-4 are examples meant to aid in understanding embodiments and should not be used to limit embodiments or limit scope of the claims. Embodiments may perform additional operations, fewer operations, operations in a different order, operations in parallel, and some operations differently. Although, FIGS. 1-4 describe a frame delivery path selection scheme for hybrid devices that implement the OSI protocol stack, embodiments are not so limited. In other implementations, the frame delivery path selection scheme can be extended to hybrid devices that employ other suitable protocol stack architectures. Additionally, it is noted that the legacy (or hybrid) network device 120 of FIG. 1 may be a legacy (or hybrid) bridging or non-bridging device, and the hybrid network device 110 of FIG. 1 may be a hybrid bridging or non-bridging device. Furthermore, although FIGS. 1-4 describe the path selection unit determining the MAC address of the preferred network interface, embodiments are not so limited. In other embodiments, the path selection unit may not determine a MAC address but may instead determine other suitable addresses depending on the communication protocols implemented by the hybrid devices and based on network architecture employed at the hybrid devices.

In some embodiments, instead of a hybrid network device (e.g., device 110 of FIG. 1) determining the preferred network interface in response to receiving the address request messages from a second network device (e.g., legacy or hybrid network device 120), the hybrid network device may be configured to respond to each address request message received at each network interface by transmitting a separate address announcement message via the network interface which the request was received and adding the MAC address of the transmit interface in each address announcement message that is transmitted. After responding to the received address request messages by transmitting separate address announcement messages out of each of the pertinent network interfaces, the hybrid network device can determine the preferred network interface for communicating with the second network device (as described above with reference to FIGS. 1-4), and then transmit a subsequent address announcement message unilaterally to the second network device to change the MAC address that the second network device will use for communicating with the hybrid network device to the MAC address associated with the preferred network interface (as described above with reference to FIGS. 1-4).

Although in some implementations the hybrid network device can determine the preferred network interface based on which address request message was received first at the hybrid network device, in other implementations the hybrid network device can determine the preferred network interface based on timestamp information may be included within the address request messages. For example, the hybrid network device can determine which address request message had the shortest time in transmit transit by comparing the difference in transmission timestamps and reception timestamps for all the received address request messages corresponding to two or more network interfaces.

In some embodiments, instead of (or in addition to) sending an address announcement message from a first network device to a second network device to control which MAC address the second network device uses for communicating with the first network device (i.e., the MAC address of the preferred network interface), the first network device can modify the forwarding decisions made by hybrid networking bridge devices (e.g., via the address announcement message and/or additional path notification messages) in order to control the path used to deliver packets from the second network device to the first network device.

Furthermore, it is noted that a hybrid network device can be any suitable network device of a "first class of communication devices" that comprises multiple communication interfaces and that is configured to operate across multiple networking technologies. A legacy or conventional network device can be any suitable network device of a "second class of communication devices" that comprises a single communication interface and that is configured to operate across a single networking technology.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider)

Figure 5:
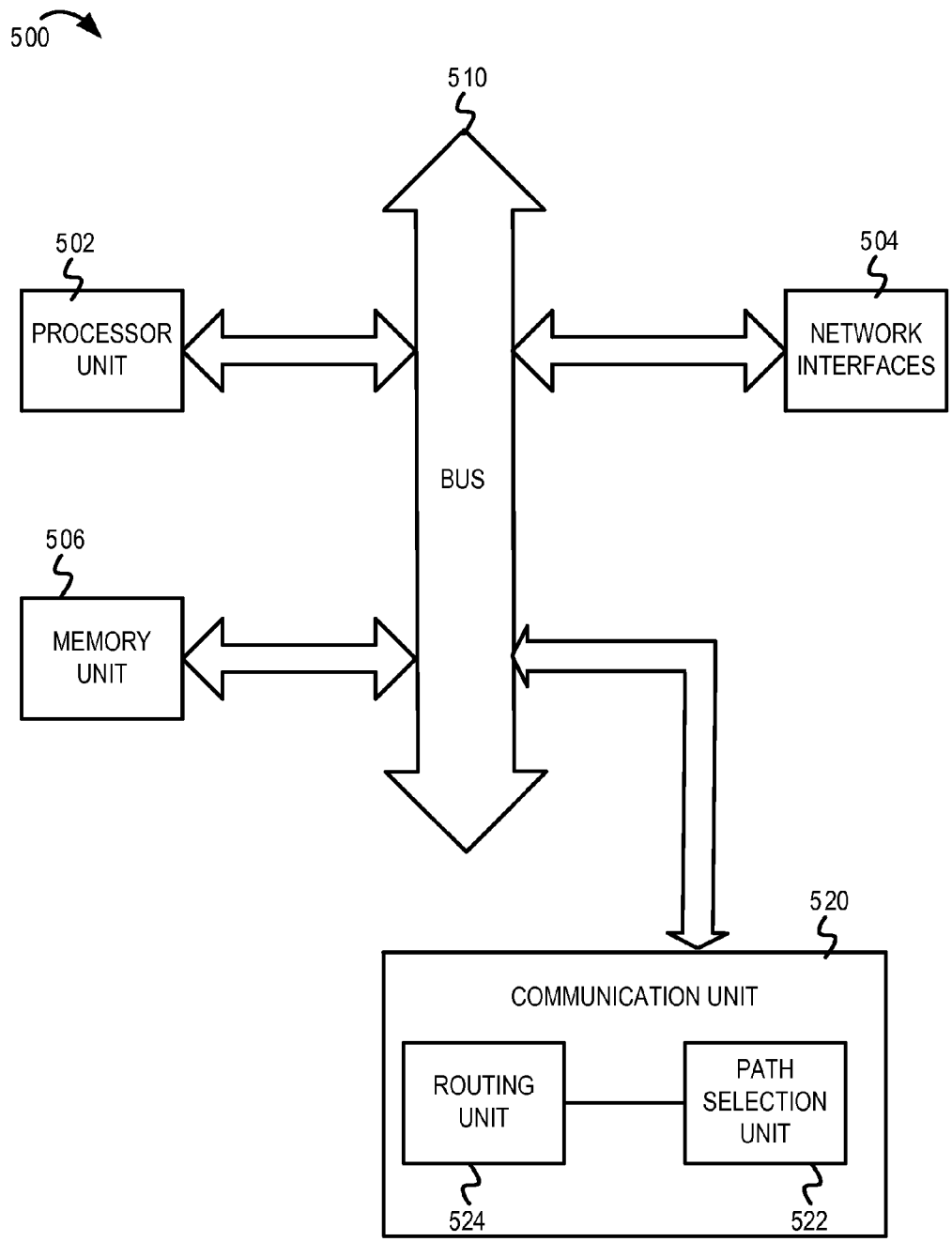
FIG. 5 is a block diagram of one embodiment of an electronic device including a frame delivery path selection mechanism for hybrid communication networks.

FIG. 5 is a block diagram of one embodiment of an electronic device 500 including a frame delivery path selection mechanism for hybrid communication networks. In some implementations, the electronic device 500 may be one of a laptop computer, a tablet computer, a mobile phone, a powerline communication device, a smart appliance, a gaming console, or other electronic systems comprising functionality to communicate across multiple communication networks (which form the hybrid communication network). The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, Infini-Band®, NuBus, AHB, AXI, etc.), and network interfaces 504 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.). In some implementations, the electronic device 500 can comprise a plurality of network interfaces—each of which couples the electronic device 500 to a different communication network. For example, the electronic device 500 can comprise a powerline communication interface and a WLAN interface that couple the electronic device 500 with a powerline communication network and a wireless local area network respectively.

The electronic device 500 also includes a communication unit 520. The communication unit 520 comprises a path selection unit 522 and a routing unit 524. As described above in FIGS. 1-4, the communication unit 520 implements functionality to determine a preferred network interface among a plurality of network interfaces of the communication unit 520. The communication unit 520 can determine an address (e.g., MAC address) associated with the preferred network interface. The communication unit 508 can then generate and transmit an address announcement message from the electronic device 500 to another network device of the hybrid communication network to control which address the network device uses for communicating with the electronic device 500.

Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 504 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, a frame delivery path selection scheme for hybrid communication networks as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for communicating in a communication network, the method comprising:
   receiving, at a first network device, copies of an address request message sent from a second network device of the communication network;
   determining a first network interface, from among a plurality of network interfaces of the first network device, for communicating with the second network device, the first network interface determined based, at least in part, on transmission timestamps and reception timestamps for the copies of the address request message;
   determining a first address associated with the first network interface of the first network device; and
   transmitting a first address announcement message from the first network device to the second network device, the first address announcement message comprising an indication of the first address associated with the first network interface.

2. The method of claim 1, wherein the first address comprises a media access control (MAC) address.

3. The method of claim 1, wherein said transmitting the first address announcement message comprises selectively responding to at least one of the copies of the address request message.

4. The method of claim 1, further comprising:
   determining a second network interface, from among the plurality of network interfaces of the first network device, for communicating with the second network device;
   determining a second address associated with the second network interface; and
   transmitting an address update message from the first network device to the second network device, the address update message comprising an indication of the second address associated with the second network interface.

5. The method of claim 1, further comprising:
   determining a second network interface, from among the plurality of network interfaces of the first network device, for communicating with a third network device;
   determining a second address associated with the second network interface; and
   transmitting a second address announcement message, from the first network device to the third network device, that comprises an indication of the second address associated with the second network interface.

6. The method of claim 1, wherein said determining the first network interface comprises:
   determining, from the copies of the address request message, which copy of the address request message was received first; and
   selecting the first network interface based, at least in part, on which of the plurality of network interfaces is associated with the copy of the address request message that was received first.

7. The method of claim 1, wherein said determining the first network interface comprises determining the first network interface based, at least in part, on at least one member of the group consisting of load balancing analysis, network conditions analysis, and network topology analysis.

8. The method of claim 1, further comprising:
   transmitting, from the first network device to the second network device, a response message from each of the plurality of network interfaces that received a copy of the address request message; and
   transmitting, from the first network device to the second network device, an address update message instructing the second network device to use the first address associated with the first network interface for communicating with the first network device regardless of the response message from other network interfaces of the plurality of network interfaces.

9. The method of claim 1, further comprising:
   determining a second network interface for communicating with the second network device;
   determining a second address associated with the second network interface; and
   transmitting, to the second network device, a second address announcement message that indicates the second address, the second address announcement message instructing the second network device to use the second address and not the first address for communicating with the first network device.

10. The method of claim 1, wherein said transmitting the first address announcement message comprises transmitting the first address announcement message from the first network interface of the first network device to the second network device to cause the second network device to use the first address associated with the first network interface for communicating with the first network device.

11. The method of claim 1, wherein the first network device belongs to a first class of network devices, and the second network device belongs to a second class of network devices.

12. The method of claim 1,
wherein said transmitting the first address announcement message from the first network device to the second network device comprises selectively responding to one of the copies of the address request message.

13. The method of claim 1, wherein determining the first network interface comprises:
determining, from the copies of the address request message, which copy of the address request message had a shortest transit time based, at least in part, on the transmission timestamps and the reception timestamps for the copies of the address request message; and
selecting the first network interface based, at least in part, on which of the plurality of network interfaces is associated with the copy of the address request message that had the shortest transit time.

14. A first network device comprising:
a plurality of network interfaces;
a path selection unit coupled with the plurality of network interfaces, the path selection unit to:
receive copies of an address request message sent from a second network device of a communication network;
determine a first network interface, from among the plurality of network interfaces of the first network device, for communicating with the second network device, the first network interface determined based, at least in part, on transmission timestamps and reception timestamps for the copies of the address request message; and
determine a first address associated with the first network interface of the first network device; and
a routing unit coupled with the plurality of network interfaces, the routing unit to:
transmit, from the first network device to the second network device, a first address announcement message in response to the copies of the address request message, the first address announcement message comprising an indication of the first address associated with the first network interface.

15. The first network device of claim 14, wherein the first address comprises a media access control (MAC) address.

16. The first network device of claim 14, wherein the routing unit to transmit the first address announcement message comprises the routing unit to selectively respond to at least one of the copies of the address request message.

17. The first network device of claim 14, further comprising: the routing unit to:
determine a second network interface, from among the plurality of network interfaces of the first network device, for communicating with the second network device;
determine a second address associated with the second network interface; and
transmit an address update message from the first network device to the second network device, the address update message comprising an indication of the second address associated with the second network interface.

18. The first network device of claim 14, wherein the path selection unit to determine the first network interface comprises the path selection unit to:
determine, from the copies of the address request message, which copy of the address request message was received first; and
select the first network interface based, at least in part, on which of the plurality of network interfaces is associated with the copy of the address request message that was received first.

19. The first network device of claim 14, wherein:
the path selection unit to determine the first network interface comprises the path selection unit to:
determine the first network interface based, at least in part, on at least one member of the group consisting of load balancing analysis, network conditions analysis, and network topology analysis.

20. The first network device of claim 14, further comprising:
the path selection unit to:
determine a second network interface for communicating with the second network device;
determine a second address associated with the second network interface; and
the routing unit to:
transmit a second address announcement message that indicates the second address, the second address announcement message instructing the second network device to use the second address and not the first address for communicating with the first network device.

21. The first network device of claim 14, wherein the routing unit to transmit the first address announcement message comprises the routing unit to transmit the first address announcement message from the first network interface of the first network device to the second network device to cause the second network device to use the first address for communicating with the first network device.

22. A non-transitory machine-readable medium having instructions stored therein, which when executed by one or more processors causes the one or more processors to perform operations that comprise:
receiving, at a first network device, copies of an address request message sent from a second network device of a communication network;
determining a first network interface, from among a plurality of network interfaces of the first network device, for communicating with the second network device, the first network interface determined based, at least in part, on transmission timestamps and reception timestamps for the copies of the address request message;
determining a first address associated with the first network interface of the first network device; and
transmitting a first address announcement message in response to the copies of the address request message, the first address announcement message comprising an indication of the first address associated with the first network interface from the first network device to the second network device.

23. The non-transitory machine-readable medium of claim 22, wherein said operation of determining the first network interface comprises:
determining, from the copies of the address request message, which copy of the address request message was received first; and
selecting the first network interface based, at least in part, on which of the plurality of network interfaces is associated with the copy of the address request message that was received first.

24. The non-transitory machine-readable medium of claim 22, wherein said operation of determining the first network interface comprises determining the first network interface based, at least in part, on at least one member of the group consisting of load balancing analysis, network conditions analysis, and network topology analysis.

25. The non-transitory machine-readable medium of claim 22, wherein said operations further comprise:
- determine a second network interface for communicating with the second network device;
- determining a second address associated with the second network interface; and
- transmitting, to the second network device, a second address announcement message that indicates the second address, the second address announcement message instructing the second network device to use the second address and not the first address for communicating with the first network device.

* * * * *